United States Patent
Akiyama et al.

(10) Patent No.: US 8,226,756 B2
(45) Date of Patent: Jul. 24, 2012

(54) EMULSION TYPE INKJET INK

(75) Inventors: Ryozo Akiyama, Shizuoka-ken (JP);
Hiroshi Kiyomoto, Kanagawa-ken (JP);
Takafumi Hara, Shizuoka-ken (JP);
Maiko Yoshida, Shizuoka-ken (JP)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 388 days.

(21) Appl. No.: 12/633,385

(22) Filed: Dec. 8, 2009

(65) Prior Publication Data
US 2010/0173079 A1  Jul. 8, 2010

Related U.S. Application Data

(60) Provisional application No. 61/142,532, filed on Jan. 5, 2009.

(51) Int. Cl.
*C09D 11/02* (2006.01)
(52) U.S. Cl. ............... 106/31.25; 106/31.67; 106/31.86
(58) Field of Classification Search ............... 106/31.25, 106/31.67, 31.86; 347/100; 427/288
See application file for complete search history.

(56) References Cited

U.S. PATENT DOCUMENTS

| 5,234,711 | A | * | 8/1993 | Kamen et al. | 106/31.67 |
| 5,358,555 | A | * | 10/1994 | Argentero et al. | 106/31.25 |
| 5,531,816 | A | | 7/1996 | Wickramanayake | |
| 6,063,835 | A | * | 5/2000 | Ohshima et al. | 523/161 |
| 6,599,496 | B2 | * | 7/2003 | Carter et al. | 424/9.1 |
| 6,682,590 | B2 | * | 1/2004 | Omatsu et al. | 106/31.5 |
| 7,172,648 | B2 | * | 2/2007 | Ichikawa | 106/31.86 |
| 2008/0241389 | A1 | * | 10/2008 | Mullay et al. | 427/256 |
| 2009/0090270 | A1 | * | 4/2009 | Okuda et al. | 106/31.26 |
| 2009/0136669 | A1 | * | 5/2009 | Watarai | 106/31.26 |

FOREIGN PATENT DOCUMENTS

| JP | 2005-054141 | 3/2005 |
| JP | 2006-056931 | 3/2006 |

* cited by examiner

*Primary Examiner* — Helene Klemanski
(74) *Attorney, Agent, or Firm* — Turocy & Watson, LLP

(57) ABSTRACT

One embodiment of the invention is an emulsion type inkjet ink including water, a pigment, an emulsifier, and an alcohol compound in which the alcohol compound is dispersed in water with the emulsifier. The emulsifier is a polyoxyethylene sorbitan fatty acid ester compound, and the alcohol compound is a compound including an aromatic ring and having a boiling point of 180° C. or higher.

19 Claims, 1 Drawing Sheet

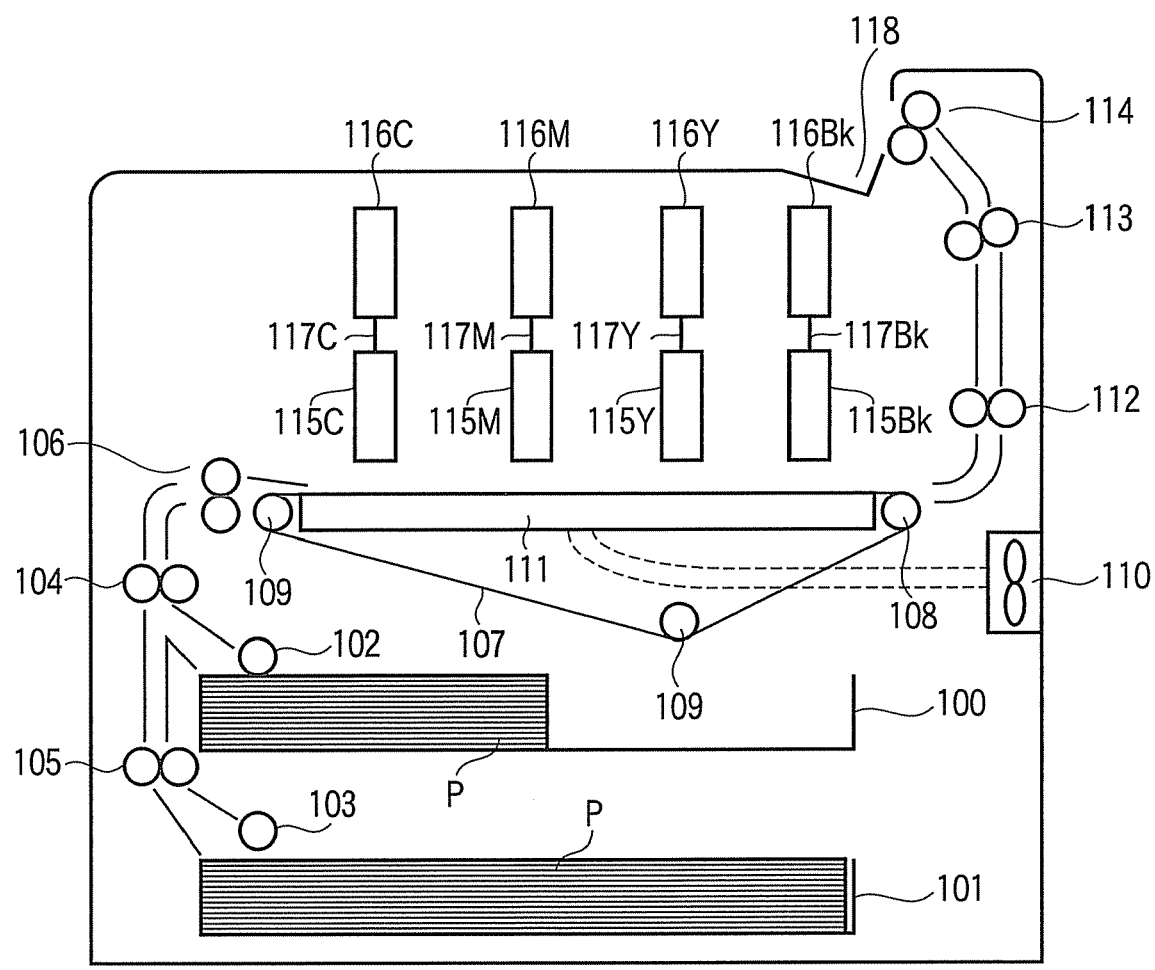

EMULSION TYPE INKJET INK

CROSS-REFERENCE TO RELATED APPLICATION

This application is based upon and claims the benefit of priority from: U.S. Provisional Application No. 61/142,532 filed on Jan. 5, 2009, the entire contents of which are incorporated herein by reference.

TECHNICAL FIELD

The present invention relates to an emulsion type inkjet ink.

BACKGROUND

As a conventional ink for inkjet printing, generally, an ink obtained by dissolving any of a variety of water-soluble dyes in an aqueous medium is used. Recently, an ink obtained by dispersing a pigment in an aqueous medium is also proposed. This is because the ink using a pigment is excellent in water resistance and light resistance as compared with the ink using a water-soluble dye.

When an inkjet ink is prepared by dispersing a pigment in a high volatile solvent such as water, the ejection performance from an inkjet head must be taken into consideration. When the solvent component volatilizes, the balance of the blending ratio of the pigment component to the solvent component is lost, and the concentration of the pigment in the ink in the vicinity of a nozzle extremely increases. As a result, a phenomenon such as an increase in viscosity of the ink or deposition of a coarse particle is caused. The nozzle is clogged, resulting in deterioration of the ejection performance. Specifically, a predetermined ejection volume is not obtained, and the flying direction turns out to be inaccurate. In some cases, a misfiring nozzle appears, too.

In many conventional pigment inks, by mainly suppressing penetrability, wetting of the ink against the paper surface is suppressed, thereby retaining ink droplets in the vicinity of the paper surface to secure the print quality. However, such type of ink cannot always be adapted to all types of paper and a difference in bleeding due to a difference of the paper type is large. In particular, when recycled paper is used, a stable print quality cannot be obtained. The recycled paper is produced by mixing a large number of unspecified types of paper. A difference in wetting property of the ink against the type of used paper affects the occurrence of bleeding. Also, when a conventional pigment ink is used, it takes a long period of time to dry a printed area due to the composition thereof. In particular, in multicolor printing such as color printing, colors printed side by side are mixed with each other. Further, since the pigment remains on the surface of paper or the like, there is also a problem that the abrasion property is deteriorated.

When a solvent having high moisture-retaining ability such as glycerol is used, although the ejection performance can be secured, the moisture-retaining effect of such a solvent is maintained even after the ink penetrates into paper. When a large amount of such a solvent is used, paper is deformed, for example, paper wrinkles or curls, and therefore, it is also necessary to limit the content of such a solvent.

In order to solve such problems, an inkjet ink which contains a solvent composed of water and an oil component, that is, an emulsion type inkjet ink is proposed.

The ink described in U.S. Pat. No. 5,531,816 is a pigment-based ink in the form of a microemulsion obtained by using a water-insoluble organic compound and a hydrotropic amphiphile. Since an ionic compound is used as the hydrotropic amphiphile, the pigment dispersion stability was affected in some cases. There is a concern that this may lead to deterioration of ejection performance.

The emulsion ink described in JP-A-2006-56931 contains an oil component having an initial boiling point of 290° C. or higher and a nonionic surfactant having an HLB of 3 to 5. The ink is a water-in-oil (W/O) emulsion and as the oil component, a low volatile mineral oil, synthetic oil, vegetable oil or the like is used. The properties such as clogging resistance and ejection stability are improved, however, print quality in terms of strike-through is not improved. This is because the penetrability into paper is increased. Further, since most of the oil component impregnated into paper does not volatilize, a method for storing a printed matter formed using such an ink is limited. When a printed matter is stored in a transparent resin film sheet, the film sheet swells and softens due to the action of the oil component and therefore turns out to be unusable. JP-A-2005-54141 describes the ink in which a saturated hydrocarbon solvent with high hydrophobicity having a boiling point of 180° C. or higher is used as the oil component, which has a similar problem.

As described above, the current situation is that an ink which is an ink for inkjet printing suitable for printing on a paper medium, is excellent in quick-drying property and image quality of a printed matter and does not cause clogging of the ink in intermittent ejection and is capable of stably dispersing a pigment over time is not obtained yet.

SUMMARY

An object of the invention is to provide an emulsion type inkjet ink which is excellent in storage stability and quick-drying property and also can form a high-quality image on a paper medium without deforming the paper medium.

Another object of the invention is to provide a method for inkjet printing capable of forming a high-quality image without deforming a paper medium using the inkjet ink excellent in storage stability and quick-drying property.

The invention provides an inkjet ink comprising:
water;
a pigment;
an emulsifier comprising a sorbitan derivative represented by either one of the following general formulae:

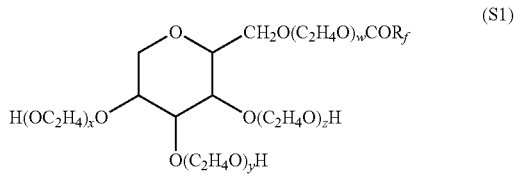

(S1)

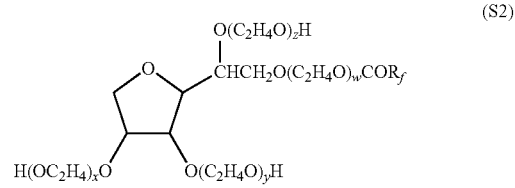

(S2)

where $R_f$ represents a group derived from a fatty acid having 6 to 24 carbon atoms; x, y, z, and w represent an integer of 0 or more, provided that x+y+z+w is 6 or less; and an alcohol compound comprising an aromatic ring and having a boiling point of 180° C. or higher, wherein the alcohol compound is dispersed in the water with the emulsifier.

Further, the invention provides an inkjet ink comprising:
water;
a pigment;
an emulsifier comprising a sorbitan derivative; and
an alcohol compound represented by the following general formula (A):

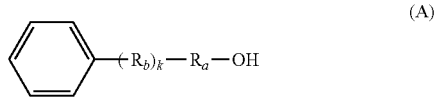

where $R_a$ represents an aliphatic hydrocarbon group having 1 to 5 carbon atoms; $R_b$ represents —O— or —CH$_2$O—; and k represents 0 or 1,
wherein the alcohol compound is dispersed in the water with of the emulsifier.

Further, the invention provides a method for inkjet printing comprising:
ejecting at least one type of ink composition onto a paper medium to form an image, the ink composition being the foregoing inkjet ink.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWING

The accompanying drawings, which are incorporated in and constitute a part of the specification, illustrate embodiments of the invention, and together with the general description given above and the detailed description of the embodiments given below, serve to explain the principles of the invention.

The single FIGURE shows an example of an apparatus for inkjet printing to which an embodiment of the invention is applied.

DETAILED DESCRIPTION

Hereinafter, embodiments of the invention are specifically described.

FIGURE is a cross-sectional view of an apparatus to be used in a method for inkjet printing according to an embodiment of the invention. Paper cassettes 100 and 101 each of which holds paper P of different size. A paper feed roller 102 or 103 takes out the paper P in response to the selected paper size from the paper cassette 100 or 101 and conveys it to conveyance roller pairs 104 and 105 and a resist roller pair 106.

A tension is given to a conveyance belt 107 by a drive roller 108 and two driven rollers 109. Holes are provided at predetermined intervals on the surface of the conveyance belt 107, and for the purpose of adsorbing the paper P onto the conveyance belt 107, a vacuum chamber 111 connected to a fan 110 is installed in the inside of the conveyance belt 107. Conveyance roller pairs 112, 113, and 114 are installed in the downstream of the paper conveyance direction of the conveyance belt 107.

In an upper part of the conveyance belt 107, four rows of inkjet heads each of which ejects an ink onto paper in response to an image data are arranged. An inkjet head 115C which ejects a cyan (C) ink, an inkjet head 115M which ejects a magenta (M) ink, an inkjet head 115Y which ejects a yellow (Y) ink, and an inkjet head 115Bk which ejects a black (Bk) ink are arranged in this order from the upstream. Further, these inkjet heads 115 are provided with a cyan (C) ink cartridge 116C, a magenta (M) ink cartridge 116M, a yellow (Y) ink cartridge 116Y, and a black (Bk) ink cartridge 116Bk, respectively, each of which contains an ink of each color. These cartridges are connected to the inkjet heads via tubes 117C, 117M, 117Y, and 117Bk, respectively.

An image forming operation of the apparatus for inkjet printing having a configuration as described above is described below.

First, image processing for printing by an image processor (not shown) is initiated, and image data for printing are transferred to the respective inkjet heads 115C, 115M, 115Y, and 115Bk. Also, a sheet of the paper P of a selected paper size is taken out one by one from the paper cassette 100 or 101 by the paper feed roller 102 or 103 and conveyed to the conveyance roller pairs 104 and 105 and the resist roller pair 106. The resist roller pair 106 corrects a skew of the paper P and conveys the paper at a predetermined timing.

The vacuum chamber 111 draws air through the holes of the conveyance belt 107, and therefore, the paper P is conveyed in a state that it is adsorbed onto the conveyance belt 107 in a lower side of the inkjet heads 115. Thus, the respective inkjet heads 115 and the paper P can keep a fixed space from each other. The ink of each color is ejected from each of the inkjet heads 115C, 115M, 115Y, and 115Bk in synchronism with the timing for conveying the paper P from the resist roller pair 106. Thus, a color image is formed at a desired position on the paper P. The paper P having an image formed thereon is discharged into a paper discharge tray 118 by the conveyance roller pairs 112, 113, and 114.

The inkjet ink according to an embodiment of the invention is contained in each of the ink cartridges.

The inkjet ink according to an embodiment of the invention contains water, a pigment, a specific emulsifier, and a specific alcohol compound, and the alcohol compound is dispersed in water by the emulsifier.

Since the inkjet ink according to an embodiment of the invention contains a specific emulsifier and a specific alcohol compound, the ink is excellent in storage stability and quick-drying property and can form a high-quality image on a paper medium. Further, deformation of the paper medium can be avoided.

The term "paper medium" as used herein generally refers to a medium made of paper to be used for printing and is broadly divided into coated paper coated with a material for increasing print properties such as art paper or coat paper and non-coated paper to be used for utilizing the properties of paper itself. The paper medium is applied to a variety of uses such as books, documents, newspapers, packages, printer sheets, etc. The paper medium also includes corrugated cardboard, containers made of paper, and thick paper such as cardboard. For example, so-called plain paper such as copy paper to be used in a copier or a printer for office or home use is a typical paper medium.

In an embodiment of the invention, the alcohol compound is an oil component for forming an emulsion and is dispersed in water by the emulsifier. In this emulsion, the pigment serving as a coloring material is contained.

The pigment is not particularly limited, and any of an inorganic pigment and an organic pigment may be used. Examples of the inorganic pigment include titanium oxide and iron oxide. Further, a carbon black produced by a known method such as a contact method, a furnace method, or a thermal method can be used.

As the organic pigment, for example, an azo pigment (such as an azo lake pigment, an insoluble azo pigment, a condensed azo pigment, or a chelate azo pigment), a polycyclic pigment (such as a phthalocyanine pigment, a perylene pigment, a perinone pigment, an anthraquinone pigment, a quinacridone pigment, a dioxazine pigment, a thioindigo pigment, an isoindolinone pigment, or a quinophthalone pigment), a dye chelate (such as a basic dye type chelate, or an acid dye type chelate), a nitro pigment, a nitroso pigment, Aniline Black or the like can be used.

Specific examples of the carbon black which is used as the black ink include No. 2300, No. 900, MCF88, No. 33, No. 40, No. 45, No. 52, MA7, MA8, MA100, and No. 2200B (all of which are manufactured by Mitsubishi Chemical Corporation), Raven 5750, Raven 5250, Raven 5000, Raven 3500, Raven 1255, and Raven 700 (all of which are manufactured by Columbian Chemicals Company), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all of which are manufactured by Cabot Corporation), and Color Black FW1, Color Black FW2, Color Black FW2V, Color Black FW18, Color Black FW200, Color Black 5150, Color Black S160, Color Black S170, Printex 35, Printex U, Printex V, Printex 1400, Special Black 6, Special Black 5, Special Black 4A, and Special Black 4 (all of which are manufactured by Degussa AG).

Specific examples of the pigment which is used in the yellow ink include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Specific examples of the pigment which is used in the magenta ink include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, and C.I. Pigment Violet 19.

Specific examples of the pigment which is used in the cyan ink include C.I. Pigment Blue 1, C.I. Pigment Blue 2, C.I. Pigment Blue 3, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Vat Blue 4, and C.I. Vat Blue 60.

Since the ink is an inkjet ink, it is preferred that the pigment has an average particle diameter of from about 1 to 300 nm. It is more preferred that the pigment has an average particle diameter of from about 10 to 200 nm.

The pigment as described above can be dispersed in water or the oil component using a dispersant. Examples of the dispersant include surfactants, water-soluble resins, and water-insoluble resins. Alternatively, the pigment may be used in the form of a self-dispersible pigment which is dispersible in water or the like without using a dispersant. The form of the self-dispersible pigment is a pigment which is dispersible in water or the like without using a dispersant and specifically, a pigment to which at least one functional group selected from a carbonyl group, a carboxyl group, a hydroxyl group, and a sulfone group or a salt thereof is bound through a surface treatment. Examples of the surface treatment include a vacuum plasma treatment, a diazo coupling treatment, and an oxidation treatment. The self-dispersible pigment is obtained by grafting a functional group or a molecule containing a functional group on the surface of a pigment through such a surface treatment.

The concentration of the pigment in the ink is preferably in the range of from 2 to 20% by weight based on the total weight of the ink. When the concentration of the pigment falls within this range, a printed matter with a required image density can be formed without causing deterioration of storage stability or ejection performance of the ink. The concentration of the pigment in the ink is more preferably in the range of from 2 to 6% by weight based on the total weight of the ink.

In an embodiment of the invention, a sorbitan derivative is used as the emulsifier. Examples of the sorbitan derivative include polyoxyethylene sorbitan fatty acid ester compounds. Alternatively, a compound represented by the following general formula (S1) or a compound represented by the following general formula (S2) may be used.

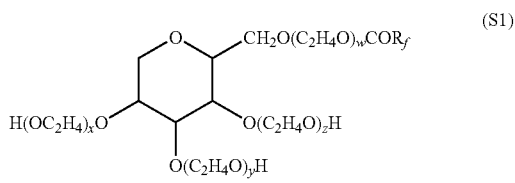

(S1)

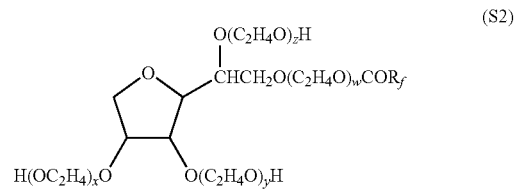

(S2)

In the general formulae, x, y, z, and w represent an integer of 0 or more, provided that x+y+z+w is 6 or less. $R_f$ represents a group derived from a fatty acid having 6 to 24 carbon atoms. The upper limit of the number of carbon atoms is preferably about 20. Any of saturated fatty acid and unsaturated fatty acid may be used. As the fatty acid, stearic acid, oleic acid, lauric acid, palmitic acid, and capric acid are preferred. Such a fatty acid is advantageous in the point that it increases the solubility of the alcohol compound represented by the general formula (A) described below.

The sorbitan derivative preferably has an HLB value of 9 or more. When the sorbitan derivative has an HLB value of 9 or more, the dispersibility of the alcohol compound in water is further more improved. The stability of the thus formed stable dispersed particles is not deteriorated even if a pigment, another additive, or the like is added. Specifically, deterioration of dispersibility such as creaming, aggregation, or coalescence hardly occurs.

More specific examples of the sorbitan derivative include sorbitan monolaurate, sorbitan monopalmitate, sorbitan monostearate, sorbitan distearate, sorbitan tristearate, sorbitan monooleate, sorbitan trioleate, sorbitan sesquioleate, polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, and polyoxyethylene sorbitan triisostearate.

The content of the sorbitan derivative as the emulsifier can be appropriately determined according to the blending ratio of an aqueous component to an oil component or the like. The aqueous component includes water and a water-soluble component and the oil component includes the alcohol compound or another oil component. If the sorbitan derivative is contained in an amount of from 1 to 20% by weight based on the total weight of the ink, the effect thereof can be obtained.

The alcohol compound is dispersed in water by the emulsifier as described above. In an embodiment of the invention, it is essential that the alcohol compound contain an aromatic ring and have a boiling point of 180° C. (1013 hPa) or higher. Since the ink is used for inkjet printing, the boiling point of the alcohol compound to be used is defined to be 180° C. or higher. Specifically, the alcohol compound is represented by the following general formula (A).

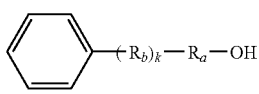

(A)

In the formula, $R_a$ represents an aliphatic hydrocarbon group having 1 to 5 carbon atoms; $R_b$ represents —O— or —CH$_2$O—; and k represents 0 or 1.

Specific examples of the compound represented by the general formula (A) include benzyl alcohol, 2-phenylethyl alcohol (CAS: 60-12-8), 3-phenyl-1-propanol (CAS: 122-97-4), 4-phenyl-1-butanol (CAS: 3360-41-6), 2-phenyl-1-propanol (CAS: 1123-85-9), 1-phenyl-2-propanol (CAS: 14898-87-4), phenoxyethanol (CAS: 122-99-6), phenoxypropanol (CAS: 770-35-4, CAS: 4169-04-4), and benzyl glycol (CAS: 622-08-2).

If the storage stability and ejection performance of the ink are taken into consideration, benzyl alcohol, phenoxyethanol, phenoxypropanol, phenylene propylene glycol, and benzyl glycol are preferred. These alcohol compounds are compounds each of which has —CH$_2$—, —CH$_2$CH$_2$—, —CH(CH$_3$)CH$_2$—, —CH$_2$CH(CH$_3$)—, or —CH$_2$CH$_2$—, respectively introduced thereinto as $R_a$ in the general formula (A).

It is preferred that the content of the alcohol compound is determined according to the content of water. Specifically, the contents of water and the alcohol compound are determined such that the weight of water is from 1 to 20 times the weight of the alcohol compound. If the weights of water and the alcohol compound fall within the above-mentioned range, the storage stability of the ink is favorably maintained and also the balance between the penetrating and drying properties and the image quality during image formation can be maintained within a favorable range.

If water is contained in the ink in an amount of from 1 to 20 times the weight of the alcohol compound, a water-soluble compound described below may be contained in the ink. In this case, the weight of the water-soluble compound is preferably 30% or less based on the weight of water. Further, if water is contained in the ink in an amount of from 1 to 20 times the weight of the alcohol compound, another oil component may be contained in the ink. Examples of the another oil component include lauric acid, capric acid, myristic acid, lauryl alcohol, and methyl laurate. The weight of such an oil component is preferably 40% or less based on the weight of the alcohol compound.

The inkjet ink according to an embodiment of the invention can be prepared as follows. First, an aqueous solution is obtained by dissolving the emulsifier in water. Then, the alcohol compound is added thereto and the resulting mixture is stirred to form an emulsion. The emulsion can be prepared by using a shear mixer capable of applying a mechanical shear stress such as a homo mixer or an ultra mixer. Alternatively, a high-pressure homogenizer capable of applying a shear stress by passing a mixture through a narrow tube at a high pressure may be used. Further, an ultrasonic disperser or the like can also be used.

It is preferred that the shear stress to be applied is appropriately adjusted according to the type of material or the like. If the shear stress is too high, the emulsified particles are broken, and if the shear stress is too low, emulsification is insufficient. In either case, there is a fear that aggregation is caused, and therefore, a uniform emulsion cannot be obtained. To the thus obtained emulsion, the pigment and, if necessary, an additive are added, whereby the ink according to this embodiment is obtained. As described above, by adding the pigment at the final stage of the preparation, disadvantage that aggregation of the pigment or separation into oil and water can be avoided, and the ink can be formed favorably.

Since the inkjet ink according to an embodiment of the invention is used for inkjet printing, it is required to have a viscosity suitable for ejection from a nozzle of a head in an inkjet printer. Specifically, the viscosity of the ink at 25° C. is preferably from 5 to 50 mPa·s, and more preferably from 5 to 30 mPa·s. If the viscosity of the ink is 30 mPa·s or less, it is possible to regulate the head control temperature during the ejecting operation to a relatively low temperature.

In order to adjust the properties of the inkjet ink such as ejection performance and penetrability to optimum conditions, a surfactant may be further blended in the inkjet ink as long as the effect of the invention is not impaired.

Examples of the surfactant include polyoxyethylene alkyl ethers, polyoxyalkylene alkyl ethers, polyoxyethylene polycyclic phenyl ethers, polyoxyalkylene polycyclic phenyl ethers, and glycerol fatty acid esters.

Further, an acetylene glycol-based surfactant or a fluorine-containing surfactant can also be used. Examples of the acetylene glycol-based surfactant include 2,4,7,9-tetramethyl-5-decyne-4,7-diol, 3,6-dimethyl-4-octyne-3,6-diol, and 3,5-dimethyl-1-hexyn-3-ol. Specific examples thereof include Surfynol 104, 82, 465, 485 and TG (all of which are manufactured by Air Products, Inc.).

Examples of the fluorine-containing surfactant include perfluoroalkyl ethylene oxide adducts, perfluoroalkyl amine oxides, perfluoroalkyl carboxylates, and perfluoroalkyl sulfonates. Specific examples thereof include Megafac F-443, F-444, F-470, and F-494 (all of which are manufactured by Dainippon Ink Chemical Industries), Novec FC-430 and FC-4430 (all of which are manufactured by 3M Co., Ltd.), and Surfron S-141, S-145, S-111N, and S-113 (all of which are manufactured by Seimi Chemicals Co., Ltd.).

It is preferred that such a surfactant is added in an amount such that the dispersion stability or the like of the emulsion ink is not deteriorated. If the surfactant is contained in the ink in an amount of about 1.0% by weight or less based on the total weight of the ink, the effect thereof can be exhibited without causing any disadvantages.

In order to adjust the viscosity of the ink and improve the storage stability, moisture-retaining property, and ejection stability, a water-soluble compound may be blended in the ink. Specific examples thereof include glycerol, diglycerol, polyglycerol, glycol compounds such as ethylene glycol, diethylene glycol, triethylene glycol, polyethylene glycol, and polypropylene glycol; and polyhydric alcohols such as 1,5-pentanediol, 1,6-hexanediol, 1,2,6-hexanetriol, 1,2,4-butanetriol, 1,2,3-butanetriol, petriol, sorbitol, mannitol, and maltitol.

In order to adjust the viscosity of the ink and improve the print quality such as abrasion property of a printed matter, a resin component may be blended in the ink. The resin component is limited to a water-soluble compound, and examples thereof include polyvinyl alcohol, hydroxypropyl cellulose, carboxymethyl cellulose, hydroxyethyl cellulose, methyl cellulose, a water-soluble acrylic resin, polyvinylpyrrolidone, gum arabic, dextrin, casein, and pectin. Among these, a water-soluble acrylic resin is particularly preferred because the water-soluble acrylic resin can further increase the fixing property of the ink to a paper medium without deteriorating the dispersibility of the pigment in the ink.

It is also possible to add a water-insoluble organic solvent with high hydrophobicity to the oil component as long as it does not cause print image strike-through or limit a storage method of a printed matter. The water-insoluble organic solvent can control the alcohol compound to be more nonpolar or polar. In this manner, it becomes possible to achieve the optimum blending ratio. As a result, the dispersion stability of the oil component dispersed in water is further improved. Examples of the water-insoluble organic solvent include mineral oils such as paraffin oil, naphthenic oil, spindle oil, and machine oil; vegetable oils such as linseed oil, castor oil, soybean oil, and tung oil; hydrocarbons having 30 carbon atoms or less; and a higher carboxylate ester or the like.

If desired, an additive such as a pH adjusting agent, an antiseptic or antifungal agent can be blended in the ink. Examples of the pH adjusting agent include potassium dihydrogen phosphate, disodium hydrogen phosphate, and sodium hydroxide.

As the antiseptic or antifungal agent, for example, sodium benzoate, sodium pentachlorophenol, sodium 2-pyridinethiol-1-oxide, sodium sorbate, sodium dehydroacetate, 1,2-dibenzisothiazolin-3-one (for example, Proxel CRL, Proxel BDN, Proxel GXL, Proxel XL-2, or Proxel TN, all of which are manufactured by Imperial Chemical Industries Limited), or the like can be used.

By blending such an additive in the ink, the print image quality or storage stability is further improved.

Hereinafter, the invention is described in more detail with reference to specific examples.

As the emulsifier, compounds shown in the following Table 1 were prepared. In the following Table 1, the names of the compounds serving as the emulsifier and others, and the HLB values are summarized together with the abbreviations.

TABLE 1

| Abbreviation | Compound name and others | HLB |
|---|---|---|
| E1 | Rheodol TW-L 106: polyoxyethylene sorbitan monolaurate | 13.3 |
| E2 | Rheodol TW-L 120: polyoxyethylene sorbitan monolaurate | 16.7 |
| E3 | Rheodol SP-L 10: sorbitan monolaurate | 8.6 |
| E4 | Rheodol AO-10V: sorbitan monooleate | 4.3 |
| E5 | NIKKOL PR15: polyglycerol hydroxy fatty acid ester | |

TABLE 1-continued

| Abbreviation | Compound name and others | HLB |
|---|---|---|
| E6 | sodium benzoate | |
| E7 | Pyrogallol | |
| E8 | Resorcinol | |

In the above Table 1, E1 to E4 are all manufactured by Kao Corporation and correspond to the compound represented by the above general formula (S1) or (S2).

As the oil component, compounds shown in the following Table 2 were prepared, and as the water-soluble compound, compounds shown in the following Table 3 were prepared.

TABLE 2

| Abbreviation | Compound name and others |
|---|---|
| A1 | benzyl alcohol |
| A2 | benzyl glycol |
| A3 | phenylene propylene glycol |
| A4 | lauric acid |
| A5 | Sunper 110 |
| A6 | soybean oil |

In the above Table 2, A1 to A3 are compounds containing an aromatic ring and having a boiling point of 180° C. (1013 hPa) or higher. That is, A1 to A3 are each the alcohol compound represented by the above general formula (A). Sunper 110 (manufactured by Sun Oil Co., Ltd.) is a common mineral oil. The soybean oil is a common vegetable oil.

TABLE 3

| Abbreviation | Compound name |
|---|---|
| OS1 | glycerol |
| OS2 | maltitol |
| OS3 | sorbitol |

Water, a pigment, an emulsifier, and an oil component were blended according to the formulation shown in the following Table 4, whereby ink samples No. 1 to No. 18 were prepared. The numerical values in the following Table 4 indicate the percentages by weight of the respective components. The water-soluble compound shown in the above Table 3 was blended as needed.

Each ink sample was prepared as follows. First, by using a homogenizer, all the components except for the color component were mixed at 5000 rpm for 30 minutes, whereby an emulsion was obtained. The resulting emulsion was an O/W emulsion. Subsequently, the color component was added thereto to form an inkjet ink. The used color component is a self-dispersible type carbon black dispersion liquid, CAB-JET-400 (manufactured by Cabot Corporation). The solid content in this dispersion liquid is shown in the following Table 4 as the content of the pigment. Incidentally, the amount of aqueous component in this dispersion liquid is contained in the amount of water in the table.

TABLE 4

| Ink sample No. | Water | Pigment | Emulsifier | | | | Oil component | | | | Water-soluble compound | | |
|---|---|---|---|---|---|---|---|---|---|---|---|---|---|
| | | | E1 | E2 | E3 | E4 | A1 | A2 | A3 | A4 | OS1 | OS2 | OS3 |
| 1 | 65 | 4 | 6 | | | | 25 | | | | | | |
| 2 | 64 | 4 | | 7 | | | 25 | | | | | | |
| 3 | 65 | 4 | | | 6 | | 25 | | | | | | |
| 4 | 63 | 4 | | | | 8 | 25 | | | | | | |
| 5 | 60 | 4 | 6 | | | | 25 | | | | 5 | | |
| 6 | 55 | 4 | 6 | | | | 25 | | | | 5 | 5 | |
| 7 | 55 | 4 | 6 | | | | 20 | | 5 | | 5 | 5 | |
| 8 | 55 | 4 | 6 | | | | 25 | | | | 5 | | 5 |
| 9 | 55 | 4 | 6 | | | | 20 | | 5 | | 5 | | 5 |
| 10 | 65 | 4 | | 5 | | | 26 | | | | | | |
| 11 | 55 | 4 | | 5 | | | 21 | | | 5 | 5 | 5 | |
| 12 | 55 | 4 | 6 | | | | 20 | | | 5 | 5 | 5 | |
| 13 | 60 | 4 | 6 | | | | 30 | | | | | | |
| 14 | 70 | 5 | 5 | | | | 20 | | | | | | |
| 15 | 60 | 4 | 6 | | | | | 25 | | | 5 | | |
| 16 | 60 | 4 | | 6 | | | | 25 | | | 5 | | |
| 17 | 60 | 4 | 6 | | | | | | 25 | | 5 | | |
| 18 | 60 | 4 | | | 6 | | | | | 25 | 5 | | |

Further, the respective components were blended according to the formulation shown in the following Table 5, whereby an ink sample No. 19 was obtained. The ink sample was prepared as follows. First, all the components were mixed and stirred for a predetermined time using a stirrer. Thereafter, the resulting mixture was filtered through a 1 μm membrane filter, whereby the ink sample No. 19 was obtained. This ink sample No. 19 is an aqueous inkjet ink having a common composition.

TABLE 5

| Ink sample No. | Water | Pigment | Surflon S-111N | Glycerol |
|---|---|---|---|---|
| 19 | 45 | 8 | 2 | 45 |

Further, the respective components were blended according to the formulation shown in the following Table 6, whereby ink samples No. 20 to No. 28 were obtained. Each ink sample was prepared as follows. First, all the components except for the color component were mixed, whereby an emulsion was obtained. Then, the color component was added thereto.

TABLE 6

| Ink sample No. | Water | Pigment | Emulsifier | | | | | | Oil component | | Glycerol |
|---|---|---|---|---|---|---|---|---|---|---|---|
| | | | E5 | E6 | E7 | E8 | E3 | E4 | A5 | A6 | A1 | |
| 20 | 48 | 7 | 3 | | | | | | 20 | 10 | | 12 |
| 21 | 55 | 5 | 5 | | | | | | | | 35 | |
| 22 | 55 | 5 | | 15 | | | | | | | 25 | |
| 23 | 55 | 5 | | | 15 | | | | | | 25 | |
| 24 | 55 | 5 | | | | 15 | | | | | 25 | |
| 25 | 55 | 5 | | | | | 10 | | | 30 | | |
| 26 | 55 | 5 | | | | | | 10 | | 30 | | |
| 27 | 55 | 5 | | | | | 10 | | 30 | | | |
| 28 | 55 | 5 | | | | | | 10 | 30 | | | |

The obtained ink compositions were evaluated in terms of print quality, quick-drying property, deformation of paper, and storage stability. The evaluation methods are as shown below. Five types of plain paper including Toshiba Copy Paper, Xerox 4024 Paper, Ricoh High-Grade Plain Paper (Type E), Tidal MP Paper, and NEUSIEDLER Paper were prepared, and an apparatus for inkjet printing mounted with a piezo head CB1 (manufactured by Toshiba Tec Corporation) was used as an apparatus.

(Print Quality)

Letters were printed on each of the above-mentioned five types of plain paper, and the print quality was evaluated. The printed letters were visually examined. Also, a print image density was examined using an X-Rite image density analyzer, and the print quality such as feathering and strike-through was determined according to the following criteria. A solid image density of 1.2 is defined as a standard value of the print image density.

The case where deterioration of both print quality and solid image density was not observed in all of the five types of plain paper is defined as "⊚". The case where deterioration of both print quality and solid image density was observed in not more than two types of plain paper is defined as "○"; and the case where deterioration of both print quality and solid image density was observed in three or more types of plain paper is defined as "Δ".

(Quick-Drying Property)

The quick drying property was evaluated using Toshiba Copy Paper as plain paper. First, solid printing at 100% duty was performed on an area of 10 mm×10 mm of the plain paper. After leaving the resulting plain paper as such for a predetermined time, new plain paper of the same type was laminated on the printed portion, and a weight of 300 g was placed thereon. After 10 seconds, the laminated plain paper was separated, and it was confirmed whether or not the ink was attached.

The time until the new plain paper was laminated after the solid printing was set to 5 seconds, 10 seconds, and 30 seconds. In each of the cases, attachment of the ink was visually examined and evaluation was performed according to the following criteria.

⊚: No attachment was observed when the set time (time until the new plain paper was laminated after the solid printing) was 5 seconds.

○: Attachment was observed when the set time was 5 seconds and no attachment was observed when the set time was 10 seconds.

Δ: Attachment was observed when the set time was 10 seconds and no attachment was observed when the set time was 30 seconds.

(Deformation of Paper)

In the same manner as the quick-drying property test, solid printing at 100% duty was performed on an area of 10 mm×100 mm of Toshiba Copy Paper, whereby a print sample was obtained. The degree of deformation of paper (corrugation height (cockle size) in the paper) was determined using a laser displacement meter, which was evaluated based on the concave-convex degree (concave-convex height difference) as follows.

⊚: Less than 0.5 mm
○: Less than 1.0 mm
Δ: Less than 2.0 mm
x: 2.0 mm or more (Storage Stability)

Each ink sample was evaluated in terms of storage stability based on the percentage change in viscosity of the ink sample after it was stored at 50° C. for 2 weeks. Specifically, the viscosity of the ink sample was measured before and after the storage and the percentage change in viscosity of the ink sample was determined, and the storage stability was determined according to the following criteria.

⊚: less than ±5%
○: ±5% to ±10% (somewhat good)
Δ: ±10% or more (somewhat bad)

If the ink sample was evaluated as "Δ" in terms of at least one of the above-mentioned four evaluation items (print quality, quick-drying property, deformation of paper, and storage stability), the ink sample was evaluated as NG. The obtained results are summarized in the following Table 7.

TABLE 7

| Ink sample No. | Print quality | Quick-drying property | Deformation of paper | Storage stability |
|---|---|---|---|---|
| 1 | ⊚ | ⊚ | ○ | ⊚ |
| 2 | ○ | ⊚ | ⊚ | ⊚ |
| 3 | ○ | ⊚ | ⊚ | ○ |
| 4 | ○ | ○ | ○ | ○ |
| 5 | ○ | ⊚ | ○ | ⊚ |
| 6 | ⊚ | ⊚ | ○ | ⊚ |
| 7 | ⊚ | ○ | ○ | ⊚ |
| 8 | ⊚ | ⊚ | ○ | ⊚ |
| 9 | ⊚ | ○ | ○ | ⊚ |
| 10 | ○ | ⊚ | ⊚ | ○ |
| 11 | ○ | ○ | ○ | ⊚ |
| 12 | ⊚ | ○ | ○ | ⊚ |
| 13 | ⊚ | ⊚ | ○ | ○ |
| 14 | ⊚ | ⊚ | ○ | ○ |
| 15 | ○ | ⊚ | ○ | ○ |
| 16 | ○ | ⊚ | ○ | ○ |
| 17 | ○ | ⊚ | ○ | ○ |
| 18 | ○ | ⊚ | ○ | ○ |
| 19 | ⊚ | Δ | X | ⊚ |
| 20 | Δ | Δ | ○ | ○ |
| 21 | ○ | ○ | ○ | Δ |
| 22 | — | — | — | — |
| 23 | — | — | — | — |
| 24 | — | — | — | — |
| 25 | — | — | — | — |
| 26 | — | — | — | — |
| 27 | — | — | — | — |
| 28 | — | — | — | — |

As shown in the above Table 7, the ink samples No. 1 to No. 18 showed good results in terms of print quality, quick-drying property, deformation of paper, and storage stability. These ink samples contain a specific sorbitan derivative and a specific alcohol compound. The ink samples No. 1 to No. 18 are each an emulsion type ink and therefore have oil-based properties as well as water-based properties, which is found from the comparison with the ink sample No. 19 which is a common aqueous ink.

The ink samples No. 5 to No. 9, No. 11 to No. 12, and No. 15 to No. 18 contain a water-soluble compound. The water-soluble compound can improve the stability of the emulsion itself, and also can improve the moisture-retaining ability of the ink. Particularly, in the ink samples No. 5 to No. 9, and No. 11 to No. 12 obtained by using benzyl alcohol as the alcohol compound, the storage stability was improved and the ink samples were evaluated as "⊚" in terms of storage stability.

The ink samples No. 15 to No. 18 obtained by using benzyl glycol or phenylene propylene glycol as the alcohol compound were evaluated as "○" in terms of storage stability. This difference is considered to be attributed to a difference in the emulsifying and dispersing effect of the alcohol compound. That is, the emulsifying and dispersing effect of a polyoxyethylene sorbitan fatty acid ester is further exhibited when benzyl alcohol is used as the alcohol compound.

In order to study the effect of HLB value on storage stability, inks were prepared according to the same formulation as that of the above-mentioned ink sample No. 1 except that the emulsifier was changed to either of the following compounds.

Rheodol SP-P10: sorbitan monopalmitate (HLB=6.7)
Rheodol SP-S20: sorbitan distearate (HLB=4.4)

The thus obtained inks were evaluated as "○" in terms of storage stability, and it was confirmed that their storage stability did not reach the level of "⊚" given to the ink sample No. 1. It was shown that if a sorbitan derivative having an HLB value of 9 or more is used as the emulsifier, the storage stability of the ink is further improved and the ink tends to be evaluated as "⊚" in terms of the storage stability.

The HLB value is an important index when an emulsion is prepared, and also in this embodiment, by using a sorbitan derivative having an HLB value of 9 or more, favorable storage stability can be secured.

The ink sample No. 20 does not contain a specific emulsifier or a specific alcohol compound. The ink samples No. 21 to No. 24 do not contain a specific emulsifier, and the ink samples No. 25 to No. 28 do not contain a specific alcohol compound.

In the case of the ink samples No. 20 and No. 21, inks could be formed. However, the formed inks were evaluated as grades lower than those of the ink samples No. 1 to No. 18, and found to be inferior in properties.

In the case of the ink samples No. 22 to No. 28, even when an ink was tried to be formed by preparing an emulsion, an ink could not be formed due to various disadvantages. For example, in some ink samples, the dispersibility of the emulsion itself was low, and the mixture was immediately separated into phases. Further, in some ink samples, when a pigment was added, the dispersibility of the emulsion rapidly decreased. In this manner, many of the ink samples had low storage stability due to generally low dispersion stability, and therefore, evaluation of the ink could not be performed.

Subsequently, by changing the weight ratio of water to benzyl alcohol, ink samples No. 29 to No. 33 were prepared according to the formulation shown in the following Table 8. The ink samples No. 29 to No. 33 contain sorbitol as the water-soluble compound. Further, the ink samples No. 31 to No. 33 contain lauric acid as an oil component in addition to benzyl alcohol.

TABLE 8

| Ink sample No. | Water | Pigment | Emulsifier E1 | Oil component A1 | Oil component A4 | Sorbitol |
|---|---|---|---|---|---|---|
| 29 | 82 | 3 | 5 | 2 | — | 8 |
| 30 | 80 | 3 | 5 | 4 | — | 8 |

TABLE 8-continued

| Ink sample No. | Water | Pigment | Emulsifier E1 | Oil component A1 | A4 | Sorbitol |
|---|---|---|---|---|---|---|
| 31 | 40 | 5 | 5 | 30 | 10 | 10 |
| 32 | 35 | 5 | 5 | 35 | 10 | 10 |
| 33 | 33 | 5 | 5 | 37 | 10 | 10 |

The thus obtained ink samples were evaluated in terms of print quality, quick-drying property, deformation of paper, and storage stability in the same manner as described above. The results are summarized in the following Table 9.

TABLE 9

| Ink sample No. | Print quality | Quick-drying property | Deformation of paper | Storage stability |
|---|---|---|---|---|
| 29 | ○ | ⊚ | ○ | ○ |
| 30 | ⊚ | ○ | ○ | ⊚ |
| 31 | ⊚ | ⊚ | ⊚ | ⊚ |
| 32 | ⊚ | ⊚ | ⊚ | ⊚ |
| 33 | ○ | ⊚ | ○ | ○ |

As shown in the above Table 8, the ink sample No. 29 contains water in an amount 41 times the weight of the alcohol compound, and the ink sample No. 33 contains water in an amount about 0.89 times the weight of the alcohol compound. In this manner, the weight ratio of water to the alcohol compound in both ink samples falls outside the range of from 1 to 20.

When attention was paid to the print quality and storage stability, the ink samples No. 29 and No. 33 were inferior to the ink samples No. 30 to No. 32. The ink sample 30 contains water in an amount of 20 times the weight of the alcohol compound and the ink sample No. 32 contains water in an amount equal to the weight of the alcohol compound.

It was confirmed that if the weight ratio of water to the alcohol compound falls within the range of from 1 to 20, the print quality and storage stability are further improved. Since the storage stability is high, the flying property of the ink is further improved.

The emulsion type inkjet ink according to an embodiment of the invention is excellent in storage stability and quick-drying property, and can form a high-quality image on a paper medium without deforming the paper medium.

Further, by the method for inkjet printing according to an embodiment of the invention, a high-quality image can be formed without deforming a paper medium using the inkjet ink excellent in storage stability and quick-drying property.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An inkjet ink comprising:
water;
a pigment;
an emulsifier comprising a sorbitan derivative represented by either one of the following general formulae:

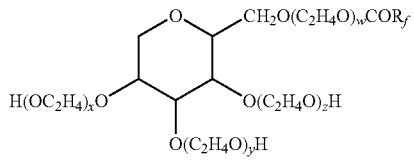

(S1)

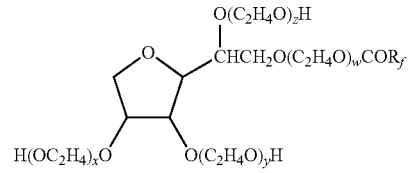

(S2)

where $R_f$ represents a group derived from a fatty acid having 6 to 24 carbon atoms; x, y, z, and w represent an integer of 0 or more, provided that x+y+z+w is 6 or less; and
an alcohol compound comprising an aromatic ring and having a boiling point of 180° C. or higher,
wherein the alcohol compound is dispersed in the water with the emulsifier.

2. The ink according to claim 1, wherein the fatty acid is stearic acid, oleic acid, lauric acid, palmitic acid, or capric acid.

3. The ink according to claim 1, wherein the alcohol compound is represented by the following general formula (A):

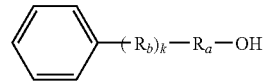

(A)

wherein $R_a$ represents an aliphatic hydrocarbon group having 1 to 5 carbon atoms; $R_b$ represents —O— or —CH$_2$O—; and k represents 0 or 1.

4. The ink according to claim 3, wherein $R_a$ in the general formula (A) is —CH$_2$—, —CH$_2$CH$_2$—, —CH$_2$CH(CH$_3$)—, or —CH(CH$_3$)CH$_2$—.

5. The ink according to claim 1, wherein the water is contained in an amount of from 1 to 20 times the weight of the alcohol compound.

6. The ink according to claim 1, wherein the pigment is contained in an amount of from 2 to 6% by weight based on the weight of the ink.

7. The ink according to claim 1, wherein the ink has a viscosity of from 5 to 30 mPa·s at 25° C.

8. The ink according to claim 1, further comprising at least one selected from the group consisting of glycol compounds and polyhydric alcohol compounds.

9. An inkjet ink comprising:
water;
a pigment;
an emulsifier comprising a sorbitan derivative; and
an alcohol compound represented by the following general formula (A):

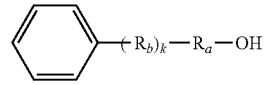

(A)

where $R_a$ represents an aliphatic hydrocarbon group having 1 to 5 carbon atoms; $R_b$ represents —O— or —CH$_2$O—; and k represents 0 or 1, wherein the alcohol compound is dispersed in the water with the emulsifier.

10. The ink according to claim 9, wherein $R_a$ in the general formula (A) is —CH$_2$—, —CH$_2$CH$_2$—, —CH$_2$CH(CH$_3$)—, or —CH(CH$_3$)CH$_2$—.

11. The ink according to claim 9, wherein the water is contained in an amount of from 1 to 20 times the weight of the alcohol compound.

12. The ink according to claim 9, wherein the sorbitan derivative is a polyoxyethylene sorbitan fatty acid ester compound.

13. The ink according to claim 12, wherein the sorbitan derivative has an HLB of 9 or more.

14. The ink according to claim 9, wherein the pigment is contained in an amount of from 2 to 6% by weight based on the weight of the ink.

15. The ink according to claim 9, wherein the ink has a viscosity of from 5 to 30 mPa·s at 25° C.

16. The ink according to claim 9, further comprising at least one selected from the group consisting of glycol compounds and polyhydric alcohol compounds.

17. A method for inkjet printing comprising:

ejecting at least one type of ink composition from an inkjet head onto a paper medium to form an image, the ink composition being the ink according to claim 1.

18. The method according to claim 17, wherein the formation of an image is performed using one type of ink composition.

19. The method according to claim 17, wherein the formation of an image is performed using 2 or more types of ink compositions of different colors.

* * * * *